Figure 1:
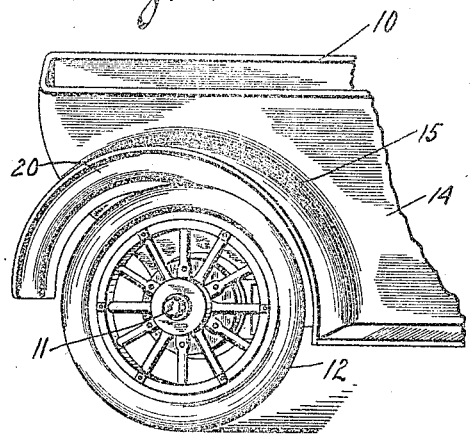

R. MERY.
AUTOMOBILE BODY CONSTRUCTION.
APPLICATION FILED OCT. 14, 1916.

1,227,290.

Patented May 22, 1917.
2 SHEETS—SHEET 1.

WITNESS
H. Raue

INVENTOR.
R. Mery
BY Emanuel Herzog
his ATTORNEY

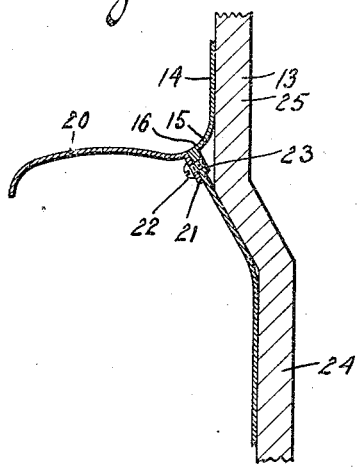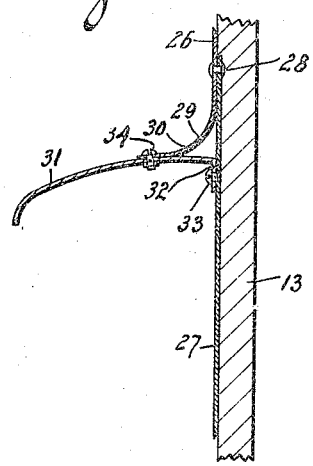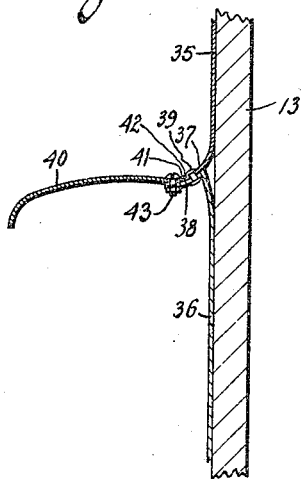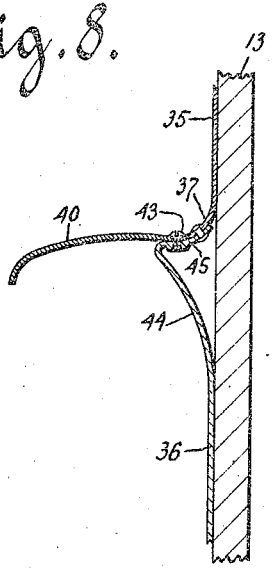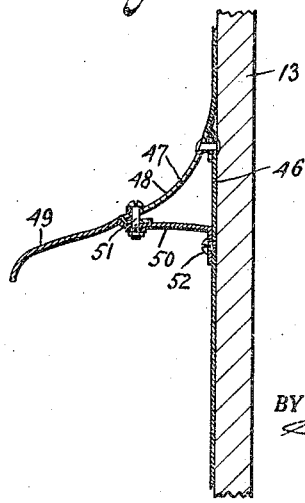

UNITED STATES PATENT OFFICE.

ROBERT MERY, OF NEW YORK, N. Y.

AUTOMOBILE-BODY CONSTRUCTION.

1,227,290.     Specification of Letters Patent.     Patented May 22, 1917.

Application filed October 14, 1916. Serial No. 125,611.

*To all whom it may concern:*

Be it known that I, ROBERT MERY, a subject of the King of Hungary, and a resident of the city of New York, in the county of New York and State of New York, have invented certain new and useful Improvements in Automobile-Body Construction, of which the following is a specification.

The present invention relates to improvements in the construction of automobile bodies.

Lately it has been the tendency to obtain in the designing of automobile bodies the so-called "stream-line" effect. In these designs all sharp bends, turns and corners are eliminated, as far as possible, to obtain smooth, curved surfaces, presenting little resistance to the flow of air. There are, of course, other reasons which have prompted the accepting of this design, such as, for instance, the facilitating of the cleaning of the automobile body; smooth surfaces can, obviously, be more conveniently and effectively washed and cleaned than surfaces having sharp bends or corners.

The designers of automobile bodies have, as far as known, succeeded in eliminating sharp bends, turns and corners from the constructions, with the exception of the junction lines of the rear mud-guards and the automobile body proper. Heretofore, the rear mud-guards were connected with the automobile body either by special brackets or by the aid of angle-irons, the brackets or angle-irons, as the case may be, being secured permanently to the automobile body, and the mud-guards to the said brackets or angle-irons detachably, for instance, by means of screws. The rear mud-guards usually extend substantially at right angles to the outer face of the automobile body, and in most of these constructions abut against the latter. At the line of abutment a sharp corner is obtained, in which dust, mud or other foreign matter is liable to collect, so that it cannot be removed even with painstaking work, the result being that, at the line of junction, the dust, etc., forms a streak which is clearly perceptible to the eye, as its color differs from that of the automobile body. Aside from this question, it is to be noted that the stream-line effect of the automobile is greatly impaired by the sharp-cornered junction line. Moreover, the sharp-cornered junction line together with the attaching means, such as the brackets or angle-irons, present substantial resistance to the flow of air, as the automobile is being operated.

The main object of the present invention is to obviate these difficulties, that is to say, to so construct and design the automobile body that the junction lines of the body and the mud-guards conform to the stream-line effect now generally accepted in the designing of automobile bodies.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

A few of the many possible embodiments of the invention are illustrated in the accompanying drawings, in which:—

Figure 2:
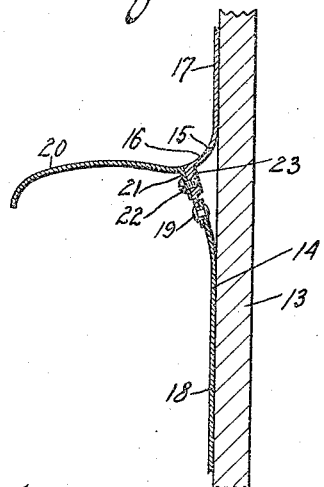

Figure 1 is a perspective view of a portion of the rear end of an automobile body, constructed in accordance with the principles of the present invention; Fig. 2 is a vertical transverse section taken through one of the sides of the rear portion of an automobile body, on a larger scale; and Figs. 3 to 9, inclusive, are similar sections taken through modifications of the invention.

Referring now first to Figs. 1 and 2 of the drawings, the numeral 10 indicates a portion of the rear end of an automobile body. This body is mounted, as well-known in the art, upon a front axle (not shown) and a rear axle 11, both of which are provided with wheels 12. The body consists of a frame 13, that is covered upon its outer face with a sheathing 14, preferably of metal. Upon each side of the body is provided in substantially parallel relation to part of the peripheries of the rear wheels 12 an outwardly extending projection 15. These projections are curved in the direction of their length substantially parallel to the peripheries of the wheels and in lateral directions, to present each a concaved upper surface 16, as appears clearly from Fig. 2 of the drawings. Below the concaved surfaces the projections slant downwardly, and at these slanting portions may be joined the several sections of the sheathing. In the case illustrated in Fig. 2 of the drawings, the sheathing adjacent the projections 15 is made of two sections 17 and 18, which are joined by a line of rivets 19, or otherwise. A mud-guard 20, curved longitudinally as the projections 15, and bent laterally according to the requirements, forms a continuation of or merges into the upper surface 16 of the respective projection 15. For the purpose of uniting a mud-guard with the sheathing, there is formed along the inner edge of the mud-guard a slanting flange 21, abutting against the slanting portion of a projection, said flange and slanting portion being joined by detachable fastenings, such as screws 22. Those parts of the slanting portions of the projections, into which the detachable fastenings are to be screwed, are made somewhat thicker, as shown at 23.

Inasmuch as the upper faces 16 of the projections 15 are curved laterally and the mud-guards form continuations or merge into these laterally curved surfaces, a streamline effect is obtained at the junction of the automobile body and mud-guards. Sharp corners, as heretofore in use on like constructions, are done away with, and so is also the possibility of dust, mud or other foreign matter lodging in the lines of junction. The resistance to the flow of air, which the curved upper surfaces 16 of the automobile body present, is considerably smaller than that of the sharp corners heretofore to be found at the junction of the mud-guards and automobile bodies.

The modification shown in Fig. 3 of the drawings differs from the one above described in that the portion 24 of the frame, that is disposed below the mud-guards, is offset in relation to the portion 25 above the same. The portion 24 is nearer to the longitudinal axis of the automobile body in order to leave more space for the wheel adjacent it. The construction of the mud-guards and the adjoining faces of the automobile body are, however, the same as of the one above described.

Figure 4:
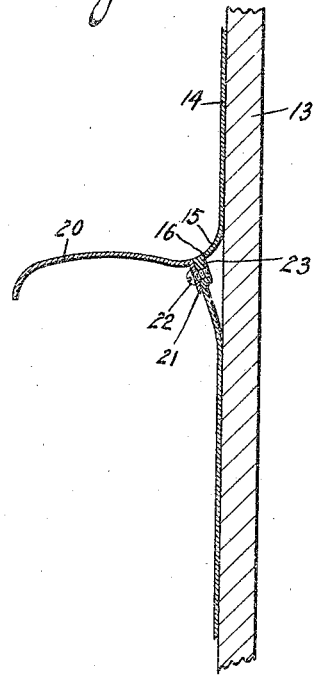

The modification shown in Fig. 4 of the drawings differs from the one disclosed by Fig. 2 in that the sheathing 14 adjacent the mud-guard is made of one integral piece. Otherwise the construction is the same.

Figure 3:
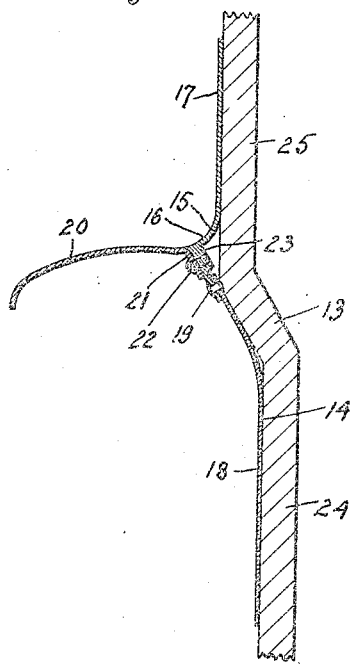

The only difference between the modification shown in Figs. 3 and 5 of the drawings is that in the latter the sheathing of the automobile body in vicinity of the mud-guard is made of one integral piece.

In the modification shown in Fig. 6 of the drawings, the sheathing is made near the mud-guard of two sections 26 and 27, which are joined above the mud-guard, for instance, by rivets 28. Below these rivets the sheathing section 26 is provided with an outwardly extending portion 29, curved longitudinally in parallel relation to part of the periphery of a rear wheel, said portion being curved laterally to present a concaved surface 30. The mud-guard 31 merges into this concaved surface, but is disposed below the curved portion 29 and provided with a flange 32, which abuts against the section 27 of the sheathing. Screws 33 join the flange 32 and the sheathing section 27. A row of screws 34 secures the curved portion 29 of the sheathing section 26 to the mud-guard.

The operation of this device is in all respects similar to those described above.

In the modification shown in Fig. 7 of the drawings, the sheathing is also made of two sections, indicated at 35 and 36. Both sections are provided with outwardly extending projections 37 and 38, respectively. These sections are curved longitudinally in the manner as the projections of the devices above described, and also laterally to present concaved upper surfaces. The sheathing sections are united by a row of rivets 39, which extend through their curved projections 37 and 38. The curved projection 38 of the section 36 extends a substantial distance beyond the curved projection 37, and serves to support the mud-guard 40. The inner edge 41 of this mud-guard abuts against the outer edge 42 of the curved projection 37 of the sheathing section 35. Screw bolts 43, or other detachable fastenings, serve to unite the mud-guard 40 with the curved portion 38 of the lower sheathing section.

The operation of this device needs no further explanation.

The modified construction shown in Fig. 8 of the drawings differs slightly from that disclosed by Fig. 7. In this case the lower sheathing section 36 is first bent outward, as shown at 44, and then provided with a curved inwardly extending projection 45, that conforms to the projection 37 of the upper sheathing section. The projection 45 extends in this case also beyond the portion 37 of the sheathing section 35, and carries the mud-guard 40, which is attached thereto by screws 43, or similar means.

In all of the devices above described the curved projections of the sheathing are shown as being made integral with the same. These curved projections, however, may be made separate, in the form of moldings, as it were. A construction of this type is illustrated in Fig. 9 of the drawings. In this construction there is attached to the sheathing 46 an outwardly extending molding or projection 47, that is curved longitudinally in substantially parallel relation to part of the circumference of a car wheel, and also laterally to present a concaved surface 48. A mud-guard 49 forms a continuation of this concaved surface, part of it, denoted by the numeral 50, being disposed below the said projection and attached to the latter and to the sheathing 46 by screws 51 and 52, respectively.

What I claim is:

1. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a mud-guard attached to each side of the body to form laterally a continuation of the projection thereof.

2. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a mud-guard detachably fastened to each side of the body to form laterally a continuation of the projection thereof.

3. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a mud-guard attached to said sheathing on each side of the body to form laterally a continuation of the projection thereof.

4. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a longitudinally and laterally bent mud-guard attached to each side of the body to form laterally a continuation of the projection thereof, the longitudinal curvature of each mud-guard corresponding to that of its respective projection.

5. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a longitudinally and laterally bent mud-guard attached to the sheathing on each side of the body to form laterally a continuation of the projection thereof, the longitudinal curvature of each mud-guard corresponding to that of its respective projection.

6. An automobile body including a sheathing provided upon each side of the body with an outwardly extending projection, each projection being curved longitudinally into substantially parallel relation to part of the periphery of the automobile wheel adjacent the same and laterally so as to present a concaved upper surface, and a longitudinally and laterally bent mud-guard detachably fastened to each side of the body to form laterally a continuation of the projection thereof, the longitudinal curvature of each mud-guard corresponding to that of its respective projection.

7. An automobile body including a sheathing provided upon each side of the body with an outwardly extending projection, each projection being bent longitudinally into substantially parallel relation to part of the periphery of the automobile wheel adjacent the same and laterally so as to present a curved upper surface, and a mud-guard attached to each side of the body to form laterally a continuation of the projection thereof.

8. An automobile body including a sheathing provided upon each side of the body with an outwardly extending projection, each projection being bent longitudinally and also laterally so as to present a concaved upper surface, and a mud-guard attached to each side of the body to form laterally a continuation of the projection thereof.

9. An automobile body including a sheathing provided upon each side of the body with an outwardly extending projection, each projection being bent longitudinally and also laterally so as to present a concaved upper surface, and a mud-guard attached to said sheathing on each side of the body to form laterally a continuation of the projection thereof.

10. An automobile body including a sheathing provided upon each side of the body with an outwardly extending projection, each projection being bent longitudinally and also laterally so as to present a curved upper surface, and a mud-guard attached to each side of the body to form laterally a continuation of the projection thereof.

11. An automobile body including a sheathing provided upon each side of the body with an outwardly extending projection, each projection being bent longitudinally and also laterally so as to present a concaved upper surface, and a longitudinally and laterally bent mud-guard attached to each side of the body to form laterally a continuation of the projection thereof, the longitudinal curvature of each mud-guard corresponding to that of its respective projection.

12. An automobile body including a sheathing provided upon each side of the body with an outwardly extending projection, each projection being bent laterally so as to present a concaved upper surface, and a mud-guard attached to each side of the body to form laterally a continuation of the projection thereof.

13. An automobile body including a sheathing provided upon each side of the body with an outwardly extending projection, each projection being bent laterally so as to present a curved upper surface, and a mud-guard attached to each side of the body to form laterally a continuation of the projection thereof.

14. An automobile body including a sheathing provided upon each side of the body with an outwardly extending projection, each projection being bent longitudinally and also laterally so as to present a curved upper surface, and a mud-guard attached to each side of the body merging into the projection thereof.

15. An automobile body including a sheathing provided upon each side of the body with an outwardly extending projection, each projection being bent laterally to present a concaved upper surface, and a mud-guard attached to each side of the body merging into the projection thereof.

Signed at New York, in the county of New York and State of New York, this 5th day of October, A. D. 1916.

ROBERT MERY.